(12) United States Patent
Martin

(10) Patent No.: US 7,583,691 B2
(45) Date of Patent: Sep. 1, 2009

(54) COMMUNICATIONS MANAGEMENT METHOD IN A RANDOM ACCESS COMMUNICATION NETWORK WITH LONG TIMES FOR TRANSMISSION OF ACCESS REQUEST ACKNOWLEDGEMENTS

(75) Inventor: Béatrice Martin, Paris (FR)

(73) Assignee: Alcatel, Paris (FR)

( * ) Notice: Subject to any disclaimer, the term of this patent is extended or adjusted under 35 U.S.C. 154(b) by 884 days.

(21) Appl. No.: 10/994,305

(22) Filed: Nov. 23, 2004

(65) Prior Publication Data

US 2005/0111480 A1 May 26, 2005

(30) Foreign Application Priority Data

Nov. 25, 2003 (FR) ................................. 03 13773

(51) Int. Cl.
*H04L 12/423* (2006.01)
(52) U.S. Cl. ....................................... 370/447; 370/461
(58) Field of Classification Search ................ 370/230, 370/235, 445, 447, 448, 458, 461, 462, 465
See application file for complete search history.

(56) References Cited

U.S. PATENT DOCUMENTS

| | | | | |
|---|---|---|---|---|
| 4,807,118 | A * | 2/1989 | Lin et al. ..................... | 709/237 |
| 5,297,144 | A * | 3/1994 | Gilbert et al. ................ | 370/346 |
| 5,371,494 | A * | 12/1994 | Singh et al. .................. | 370/448 |
| 6,005,853 | A * | 12/1999 | Wang et al. .................. | 370/332 |
| 6,522,635 | B1 | 2/2003 | Bedwell | |

OTHER PUBLICATIONS

Kueh V Y H et al: "W-CDMA random access channel transmission enhancement for satellite- UMTS" 13th IEEE International Symposium on Personal Indoor and Mobile Radio Communications. PIMRC 2002. Proceedings (Cat. No. 02TH8637), Proceedings of 13th IEEE International Symposium on Personal Indoor and Mobile Radio Communications (PIMRC 20020, PAVILH, Sep. 15, 2002, pp. 1377-1381 vol. 3, XP010611489 2002, Piscataway, NJ, USA, IEEE, USA.

Schulist M: "Acknowledgement of 3GPP WCDMA Random and Packet Access Applying Space-Time Transmit-Diversity" VTC 2001 Spring. IEEE VTS 53rd. Vehicular Technology Conference. Rhodes, Greece, May 6-9, 2001, IEEE Vehicular Technology Conference, New York, NY: IEEE, US, vol. 4 of 4 conf. 53, May 6, 2001, pp. 2519-2523, XP001076213.

* cited by examiner

*Primary Examiner*—Seema S Rao
*Assistant Examiner*—Mon Cheri S Davenport
(74) *Attorney, Agent, or Firm*—Sughrue Mion, PLLC

(57) ABSTRACT

A method is dedicated to communications management for a random access communications network, in which time intervals are broken down into access slots, and during each access slot, a network terminal can transmit an access request to the network associated with a message that it wants to transmit, and comprising at least one processing device that introduces a long time for transmission of an access request acknowledgement message. This method consists of periodically sending acknowledgement messages to terminals, each message comprising positive acknowledgement information associated with each authorized access slot. Thus, when a requesting terminal receives an acknowledgement message later than an access request transmitted during a given access slot, it can transmit the message associated with its access request.

18 Claims, 2 Drawing Sheets

COMMUNICATIONS MANAGEMENT METHOD IN A RANDOM ACCESS COMMUNICATION NETWORK WITH LONG TIMES FOR TRANSMISSION OF ACCESS REQUEST ACKNOWLEDGEMENTS

CROSS-REFERENCE TO RELATED PATENT APPLICATION

This application claims the benefit of French Patent Application No. 0313773, filed on Nov. 25, 2003, in the French Intellectual Property Office, the disclosure of which is incorporated herein in its entirety by reference.

BACKGROUND OF THE INVENTION

The invention relates to the field of random access communication networks with long times for transmission of access request acknowledgement messages, and particularly management of communications within such networks.

DESCRIPTION OF THE RELATED ART

In some networks of the above-mentioned type, for example networks comprising an ALOHA "slotted" access, communication terminals cannot transmit messages except during time intervals authorized by the network.

More precisely, during its first access to the network, a requesting terminal must transmit signals representative of a preamble defining an access request in order to transmit an associated message, for example to a network base station.

To achieve this for example for the case of a UMTS type network, the terminal transmits the preamble with a signature chosen at random from among N signatures (for example N=16), in a specific Random Access Channel (RACH) and in an access slot with a predefined width. For example, in an ALOHA slotted type access network, the preamble extends over a period equal to 4096 chips and the width of an access slot is equal to 5120 chips (corresponding to 1.3 ms).

The map of access slots during which terminals are authorized to sent their preambles can be configured and periodically distributed to terminals located in the network coverage area. Furthermore, the time reference of the base station is distributed periodically through the network on a synchronization channel dedicated to terminals located in its coverage area.

The message associated with a transmitted preamble cannot be sent by the requesting terminal unless the said preamble has actually been acknowledged by the network, and more precisely by one of its access request management equipment, for example like a base station (or Node B). If the requesting terminal did not receive the acknowledgement message within a predefined and configurable acknowledgement time, it sends another preamble, possibly in an access slot different from the first. The number of preambles that can be sent consecutively, and the period at which preambles are sent, are predefined and can be configured. They are distributed periodically through the network to terminals located in its coverage area.

A preamble is said to be acknowledged when the access request management equipment (for example a base station) has determined that the terminal that sent it is present and the terminal has received an acknowledgement message from the equipment within the acknowledgement time mentioned above.

However, some random access networks comprise devices or equipment that introduce long or very long acknowledgement message transmission times, compared with the times for acknowledgement of existing ASIC equipped terminals with a fast response time. This may be the case particularly for a radio repeater such as a communication satellite, or more simply a processing card for example installed in a base station (or Node B). For example, in a network comprising a repeater arranged in the form of a "transparent" geostationary satellite, the acknowledgement message for an access request cannot be received by the terminal that sent the said access request before about 500 ms, while the acknowledgement times are typically of the order of a few milliseconds (2 ms and 3.3333 ms in the case of a UMTS 3GPP network).

The result is that messages associated with access requests can never be transmitted by terminals of the above-mentioned type.

Several solutions have been proposed to attempt to overcome this disadvantage. A first solution consists of using acknowledgement times with a duration similar to the network acknowledgement message transmission time. The hardware and software configurations of equipment and particularly terminals then have to be modified.

A second solution consists of eliminating acknowledgement messages (addressed to the level 1 protocol layer (or physical layer) of terminals) and/or forcing transmission of messages associated with access requests while the acknowledgement message has not been received. But, the access is no longer of the ALOHA slotted type. Furthermore, since there was no acknowledgement, the level 2 and 3 protocol layers of terminals did not receive the level 2 and 3 requests, and consequently cannot acknowledge them. Standards for the transmission interface and hardware and software configurations of the equipment, and particularly of terminals, then have to be modified.

There is no known fully satisfactory solution, therefore the purpose of the invention is to improve the situation.

SUMMARY OF THE INVENTION

To achieve this, it proposes a communication management method for a random access communications network, comprising at least one processing device that introduces a long transmission time for access request acknowledgement messages, compared with acknowledgement times expected from network terminals.

This method consists of periodically sending acknowledgement messages to network terminals, each message comprising positive acknowledgement information associated with each authorized access slot. Thus, when a requesting terminal receives an acknowledgement message later than an access request transmitted during a given access slot, it can transmit the message associated with its access request.

Note that a conventional acknowledgement message normally comprises acknowledgement information generally in the form of a number that can be equal to one of two different values, namely +1 and −1. The value −1 denotes a so-called negative acknowledgement corresponding to detection of an access collision by the network. The value +1 denotes a so-called positive acknowledgement corresponding to the effective acknowledgement of the access request by the network. In the case of a UMTS network, the above mentioned number may also be equal to a third value equal to 0, corresponding to an access request with an unavailable (or an unauthorized) signature being sent.

Therefore, the invention consists of periodically transmitting acknowledgement messages containing only the values +1, for each access slot, for example for all authorized access slots, to level 1 protocol layers (or physical layers) of terminals, during the time interval set aside for acknowledgements (for example every one or two milliseconds).

Access collision problems can then be handled by the network (since it detected an access collision) and/or by terminals (since their level 2 and 3 protocol layers cannot act without network acknowledgement). For example, when the network detects a collision of access requests, it does not handle reception. The network may also not transmit auxiliary acknowledgement messages to terminals concerned by the collision, addressed to level 2 and 3 protocol layers, when it detects a collision access request. For example, when a terminal has just transmitted its message after reception of an acknowledgement message, it can resend its access request if it has not received an auxiliary acknowledgement message from the network.

According to another aspect of the invention, when a terminal wants to transmit a message but the network has detected a collision with the access request from another terminal, the terminal can resend its access requests at variable time intervals, for example within an interval between about one tenth of a millisecond and a few tens of a millisecond. For example, this time may vary at random or by dichotomy.

According to another aspect of the invention, when the network has actually acknowledged a first access request transmitted by a terminal, it assigns a dedicated two-directional channel to this terminal, and it then analyzes the contents of each measurement report message, for measurements made by the terminal on this dedicated channel in the network to terminal direction (forward channel) and/or the signal quality that it receives on the dedicated channel (return channel) to adapt its sending power as a function of the contents of each message. In this case, the network may send message(s) to reconfigure report messages, on the dedicated channel.

According to yet another aspect of the invention, when the network has actually acknowledged a first access request transmitted by a terminal, and assigned a dedicated two-directional channel to this terminal, it can analyze the signal quality that it receives on this dedicated channel, to adapt at least part of the configuration parameters of the dedicated channel if necessary, for example such as the sending power of the terminal concerned, as a function of the quality of the analyzed and received signals, and then following adaptation, it can send a reconfiguration message on the dedicated channel containing the adapted parameters so that the terminal can modify the configuration of its dedicated channel in the terminal to network direction (return channel). Furthermore, when the terminal has modified the configuration of its dedicated channel in the terminal to network direction (return channel), it may send a modification executed confirmation message to the network.

The invention also proposes equipment for management of access requests to a random access communications network, comprising at least one processing device introducing a long transmission time for access request acknowledgement messages, arranged to use a method of the type mentioned above.

The invention is particularly, although not exclusively, suitable for the field of radio, land 3GPP and/or satellite communications, and particularly W-CDMA, CDMA 2000 by satellite (IS95), TTA, CCSA, S-UMTS and S-GSM/GPRS type networks, and for the field of optical communications through optical fibers.

BRIEF DESCRIPTION OF THE DRAWINGS

Other characteristics and special features of the invention will become clearer after reading the following detailed description and the appended figures, wherein.

The appended figures can be used not only to complement the invention, but also to contribute to its definition if applicable.

DETAILED DESCRIPTION OF EXEMPLARY EMBODIMENTS OF THE PRESENT INVENTION

The purpose of the invention is to enable adaptation of the management of random access communication networks with long transmission times for access request acknowledgement messages, in the presence of communication terminals provided with ASICs (or any other processing module, for example such as a reprogrammable FPGA type electronic module) with fast response time.

In the following description, a "communication terminal" means any network equipment capable of exchanging data in the form of signals, either with other equipment through their attachment network(s), or with its own attachment network. Therefore, for example it could apply to user equipment such as fixed or portable computers, cellular phones, personal digital assistants (PDA) or servers.

Furthermore, in the following, it is assumed as an illustrative example that the communications network is a satellite type network and has an ALOHA slotted type access mechanism presented in the introductive part. But the invention is not limited to this type of network alone. It applies to all communication networks, that communication terminals can access using a random access procedure based on sending a preamble (or access request) during access slots, and including devices or equipment that introduce acknowledgement message transmission times that are long or very long compared with acknowledgement times of terminals equipped with ASICs with fast response time. Thus, the invention relates to random access communication networks that comprise radio relays or repeaters, possibly of the satellite type, for example W-CDMA, CDMA 2000 by satellite (IS95), TTA, CCSA, S-UMTS and S-GSM/GPRS networks.

In the following, as an illustrative example, it is assumed that terminals are user equipment (UE) of the cellular phone type connected to a 3G type satellite communications network, for example such as an S-UMTS network, and operating according to the so-called Frequency Division Duplex (FDD) mode, or the Time Division Duplex (TDD) mode.

Figure 1:
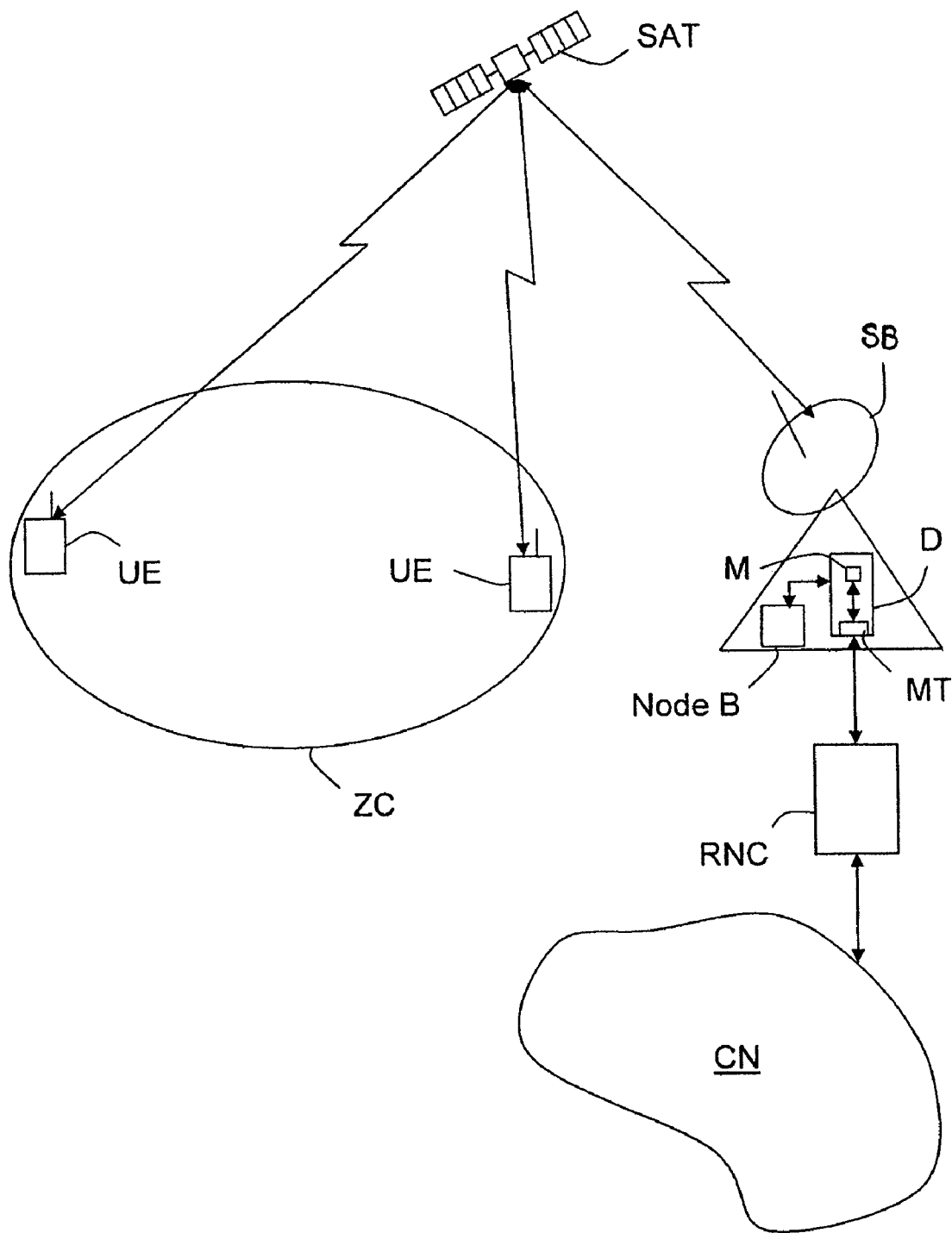
FIG. 1 diagrammatically illustrates an example embodiment of part of a satellite communications network including an SB gateway provided with a base station coupled to a device according to the invention, and FIG. 2 diagrammatically illustrates an example breakdown of a time interval (IT) in 15 access slots (AS) within an acknowledgement channel AICH, and the physical structure of an acknowledgement message (or indicator) within an access slot.

As shown very diagrammatically in FIG. 1 but in sufficient detail for understanding the invention, a UMTS network with satellite access (or S-UMTS) may be considered as being a Core Network (CN) coupled to a satellite access network.

The satellite access network comprises firstly at least one satellite base (SB) station or gateway, connected to the Core Network CN through a Radio Network Controller (RNC) node, integrating a Node B in the UMTS network. It also comprises at least one satellite SAT for exchanging data by radio between the satellite base station SB and user equipment UE, such as cellular phones equipped with a satellite transceiver. The satellite link forms a satellite interface. The RNC is also required for serving and control. It is called a controlling and serving RNC.

The Node B processes the signal within the base station SB, and particularly manages access requests. It is also associated with one or more cells each covering a radio area within which one or several items of user equipment UE may be located. The cell(s) in a Node B, integrated into a satellite base station (SB), are included in the coverage area ZC of the satellite SAT associated with this satellite base station (SB) (in this case one cell corresponds to one satellite spot).

As indicated in the introduction, when a UE terminal would like to communicate a message containing data in this type of satellite network, when it first accesses the network it must send an access request (or preamble) to the satellite base station SB, hereinafter called the gateway. To achieve this, the UE terminal generates a preamble accompanied by a signature which, in the case of an ALOHA slotted type access, extends for a duration of N chips, for example N=4096 chips. For an S-UMTS network, the signature is chosen at random from among 16 signatures.

The UE terminal then sends the preamble in the form of radio signals to the satellite SAT that covers the cell in which it is located, using a dedicated random access channel (RACH) in one of the authorized access time slots. The satellite SAT then transmits the signed preamble to the gateway SB.

In a traditional network, when the gateway SB receives the access request (or preamble), it must use an acknowledgement mechanism consisting particularly of deducing the access slot used by the requesting UE terminal, to deduce the time interval during which the preamble is received (that can be determined in relation to the network time reference), then the signature used and the presence of the said UE terminal. If all this information has been determined correctly and the signature used is an authorized signature, the gateway SB generates acknowledgement information $AI_s$ with a value equal to +1. If all this information has been correctly determined but the signature used is not an authorized signature, the gateway SB generates acknowledgement information $AI_s$ with a value equal to 0. Finally, if at least one or more of the above-mentioned items of information cannot be determined, then there is an access request collision and the gateway SB generates acknowledgement information $AI_s$ with a value equal to −1. An access collision occurs when at least two terminals have sent a preamble on the same access slot with the same signature.

Figure 2:
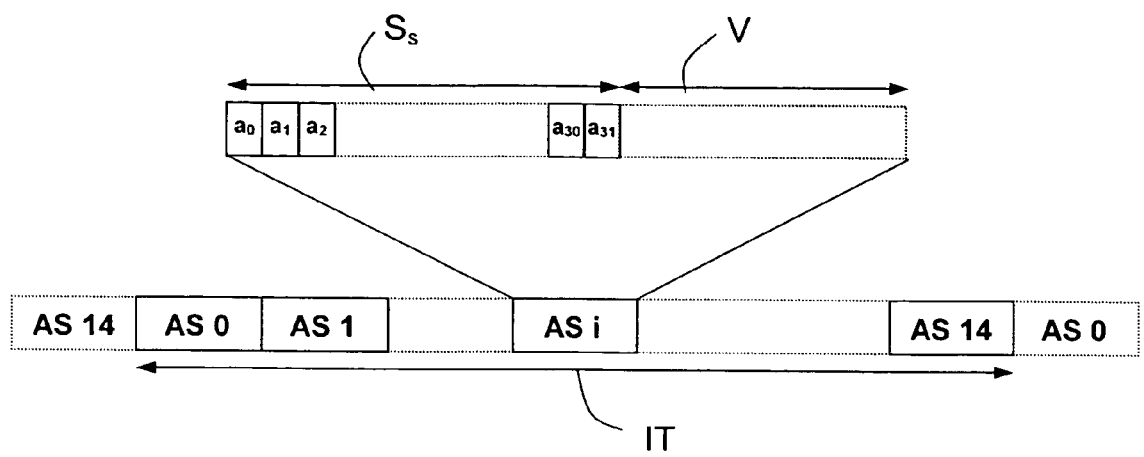

The gateway SB then transforms the acknowledgement information $AI_s$, associated with the signature s of a preamble received in an access slot AS i, into a sequence $S_s$ of symbols $a_j$, illustrated in the top part of FIG. 2.

More precisely, the sequence $S_s$ comprises symbols $a_j$ as defined below:

$$a_j = \sum_{s=0}^{15} AI_s b_{s,j}$$

where j=0 to 31, $AI_s$=+1, 0 or −1, and $b_{s,j}$ values denote bit configurations as a function of each signature s.

This sequence $S_s$ only occupies 4096 chips, and an access slot may contain 5120 chips (which corresponds to 1.3 ms), therefore there is an unused empty space V. In other words, $S_s$ forms an acknowledgement message associated with a signature s.

The gateway SB then inserts the acknowledgement message ($S_s$) into the AICH channel dedicated to the transmission of acknowledgement messages, during one of the k access slots (AS) k, as illustrated in the bottom part of FIG. 2. In the illustrated example, each time interval IT is broken down into 15 access slots, such that it lasts for 20 ms. But obviously, other decompositions are possible.

Since each requesting UE terminal listens to the AICH channel, it can therefore extract the acknowledgement message associated with the signature that it had used, from it to send its preamble (or access request), and deduce whether or not acknowledgement is effective from this message.

As mentioned in the introduction, if the acknowledgement is effective but the UE terminal has received the acknowledgement message outside the acknowledgement time for which its ASIC is configured, it cannot send the message associated with the previously transmitted preamble. In the meantime, it has sent its preamble again using a new signature drawn at random and a new access slot, or it may have abandoned the procedure. Therefore, a UE terminal can never transmit its messages in a network concerned by the invention.

The invention is intended to overcome this problem.

It proposes a new communication management method for this purpose, in which the gateway SB does not transmit an acknowledgement message on the AICH channel in response to a received access request (or preamble), but it periodically sends acknowledgement messages to all UE requesting terminals in the network, and more precisely to their level 1 protocol layer (or physical layer), each acknowledgement message comprising positive acknowledgement information associated with each of the authorized access slots.

In other words, the gateway SB permanently (periodically) generates sequences $S_s$ of symbols $a_j$, of the type presented above (with reference to FIG. 2), but for which the acknowledgement information $AI_s$ is permanently equal to +1 (positive acknowledgement). Consequently, all sequences $S_s$ that are generated periodically in sequence and which correspond to each of the different authorized signatures, can transfer information by which requesting terminals UE can understand that their access request associated with the signature s has actually been acknowledged by the network.

Therefore, UE terminals receive a positive acknowledgement message associated with one of the signatures, every 1.3 ms (duration of an access slot). Consequently, a requesting UE terminal that transmitted an access request with the signature s is certain that it will receive a positive acknowledgement message associated with this signature s and authorizing its level 1 protocol layer to transmit the message associated with the said access request, within the acknowledgement time for which its ASIC is configured.

At the same time as the gateway SB generates its positive acknowledgement messages in a loop, it performs the conventional acknowledgement mechanism described above, but without terminating it by sending an acknowledgement message. This actually means detecting a collision of access requests.

The gateway SB then keeps the result of the collision detection corresponding to the signature used. Thus, when the gateway SB has detected a collision of access requests, and when it receives a message associated with one of these access requests affected by a collision, it may be configured so as to not process the received message (no decoding). To achieve this, the gateway SB simply accesses the memory in which the results are stored in order to extract the result of the collision that is stored in it corresponding to the signature associated with the received message. Then, all it has to do is to choose whether it has to process the message or reject it depending on the extracted result.

As a variant, or in addition, the gateway SB may be configured, as in a conventional operation, so that it will not transmit the auxiliary acknowledgement message addressed to its level 2 and 3 protocol layers, to the UE terminal concerned by the collision, when it has detected an access requests collision and when it receives a message associated with one of these access requests affected by the collision.

The message sent by a UE terminal comprises data requesting the gateway SB to send an auxiliary acknowledgement message to the level 2 and 3 protocol layers of the said terminal. The lack of reception of an auxiliary message with positive acknowledgement notifies the level 2 and 3 protocol layers of the UE terminal that the previously sent access request has not been actually acknowledged. Consequently, they order the physical layer (level 1 protocol layer) to resend the access request.

In order to implement the management method described above, the gateway SB may be equipped with a management device D coupled to the Node B as illustrated in FIG. 1, comprising a processing module MT that generates positive acknowledgement messages in a loop and detects collision of access requests, and possibly a memory M in which collision detection results are stored corresponding to the signatures used.

As a variant, the device may be implanted directly in the Node B. The device D may be implanted in any modem type of network equipment, receiving radio signals and responsible for managing access requests, and particularly in base stations (BTSs).

It is important to note that the device D according to the invention can be configured so as to enable cohabitation of unmodified type terminals (in other words for which the ASICs (or processing modules) have a fast response time and are concerned by the invention), and of the modified type (in other words for which ASICs have a slow response time and are not concerned by the invention). In this case, it is preferable to reserve access slots and specific signatures for each type of terminal. In particular, this means progressive introduction of modified terminals into the network, accompanied by a tunable distribution of signatures by type, thus saving sending power.

The invention is also applicable to temporary access to a random access network of terminals foreign to the said network, for example in the case of land UMTS terminals equipped with an RF tuning module in the MSS band, in a crisis (or emergency) situation, or when the terminal does not have an RF tuning module in the MSS band and the satellite is authorized to temporarily send and/or receive in the land frequency band.

The management device D, and particularly its processing module MT and its memory M, may be made in the form of electronic circuits, software (or data processing) modules or a combination of circuits and software.

According to another aspect of the invention, the terminals UE can be configured so that they resend their access requests at variable time intervals, when they have not received an acknowledgement message within a predefined time interval after an access request was sent.

For example, time intervals may vary between about a tenth of a millisecond and a few tens of a millisecond.

Furthermore, this variation may be increasing or it may be chosen at random, or by dichotomy.

Another aspect of the invention relates to control over the sending power of the gateway SB on the so-called forward channel (from the network to a terminal) and UE terminals on the so-called return channel (from a terminal to the network).

As those skilled in the art know, in a random access network, once the gateway SB has received an access request from a UE terminal, and has actually acknowledged this access request, and has received the message associated with the access request from the UE terminal, it allocates a two-directional channel dedicated to its connection with the UE terminal.

Note that allocation of a dedicated channel in a CDMA type network consists of allocating a dedicated code, allocation of a dedicated channel in a TDMA type network consists of allocating a dedicated access slot, and allocation of a dedicated channel in a FDMA type network consists of allocating a dedicated frequency.

Furthermore, a dedicated channel may be allocated at any time during the communication, or during part of it only. This time may possibly be interrupted by micro-cuts.

As a result of this dedicated channel (in the example described here, it is a dedicated code), the UE terminal no longer needs to make random accesses.

The configuration parameters of the dedicated channel are determined by the gateway SB and are transmitted to the UE terminal in the form of a configuration message. In particular, configuration parameters include the sending power of the UE terminal on the return channel, the flow, the dedicated code, interlacing ratio and the Forward Error Correction (FEC).

The UE terminal initiates configuration parameters received on the return channel of its dedicated channel.

Then, throughout the communication, the gateway SB checks the loop power on the forward channel and on the return channel, at the physical layer (level 1 protocol layer).

This power control was designed for equipment with fast response time. Typically, the gateway SB generates a power control command (or reconfiguration command) every 666 µs (in order to overcome fast fading).

In a network with slow response time, in other words in networks concerned by the invention, the power control command frequency is not adapted so that it induces destructive oscillations.

A few rare solutions have been proposed to attempt to improve the situation, but they are not fully satisfactory.

Therefore, the invention is intended to improve the situation.

As those skilled in the art know, the network configures each UE terminal to make predefined measurements on the forward channel of the dedicated channel. These measurements are usually carried out on what is called the pilot signal. This signal is broadcast through the network over its entire coverage area ZC. It does not include any useful information and is used for synchronization of UE terminals on the network time reference and to determine losses that occurred on the forward channel of each dedicated channel.

For example, measurements apply to the quality and/or level of the received pilot signal.

Therefore, the invention proposes to adapt the sending power of the gateway SB on the forward channel of a dedicated channel as a function of the contents of each measurement report message that the UE terminal addresses to it conventionally and/or the quality of the signal that it receives from the UE terminal on the return channel of this dedicated channel.

According to the invention, the gateway SB (and for example its processing module MT) starts by analyzing the contents of each measurement report message that it receives on a channel dedicated to its link with a UE terminal and that apply to its forward channel, and/or the signal quality that it receives from the UE terminal on the return channel of this dedicated channel. The gateway SB then adapts its sending power on the forward channel of the dedicated channel as a function of the contents of the analyzed message and/or the quality of the analyzed signals.

When the gateway SB no longer has enough information to adapt its power, it may be arranged so as to send report message reconfiguration messages sent by the UE terminal concerned, on the dedicated channel. On reception of such a reconfiguration message, the UE terminal reconfigures its measurement parameters and sends the results of the reconfigured measurements to the gateway SB.

It is important to note that tuning of measurement configuration parameters defined in reports is not compulsory. The gateway SB can be adapted to the sending power of a dedicated channel as a function of contents of report messages, for which the parameters are always the same.

The invention also proposes to adapt at least part of the configuration parameters for the return channel of a dedicated channel when the gateway SB perceives that the current configuration is not optimum when analyzing the quality of signals that it receives from a UE terminal on this return channel.

Thus, whenever necessary, the gateway SB determines one or several new configuration parameters for the return channel of the dedicated channel, and preferably its sending power. The gateway SB then generates a reconfiguration message of the dedicated channel that it sends to the UE terminal concerned on the forward channel. On reception of such a reconfiguration message, the UE terminal reconfigures the parameters of the return channel, and for example its send power.

Furthermore, when the UE terminal has finished reconfiguring the parameters of the return channel of its dedicated channel, it may be arranged so as to send a modification execution confirmation message to the gateway SB.

The power control according to the invention is particularly suitable for the context of GEO type satellite networks, without modification to the 3GPP interface, and therefore without modification to network equipment concerning this interface.

The invention is not limited to methods of making management devices, access request management equipment and management processes described above, which are given only for examples, but it encompasses all variants that those skilled in the art could envisage in the context of the claims given below.

Thus, the above describes an application of the invention to a radio network is, but the invention is equally applicable to optical networks with optical fibers comprising repeaters introducing long transmission times for acknowledgement messages (for example this is the case for transatlantic submarine lines).

The invention also relates to gateways equipped with measurement devices designed to measure the received power of the said satellites through pilot signals sent by the satellites, in order to transmit it to the associated Nodes Bs.

The invention claimed is:

1. A communications management method for a random access communications network, in which time intervals are broken down into access slots, and during an access slot, a network terminal transmits an access request to the random access communications network associated with a message to be transmitted by the network terminal, and said random access communications network comprises at least one processing device that causes a time required for transmission of an access request acknowledgement message acknowledging the access request to said network terminal to exceed a duration of the given access slot, the method comprising:

periodically sending an acknowledgement message to said network terminal, said acknowledgement message comprising positive acknowledgement information associated with said access slot, wherein if the acknowledgement message acknowledging the access request is received during the access slot in which the access request was transmitted, the network terminal transmits the message associated with said access request.

2. The method according to claim 1, wherein if said random access communications network detects a collision of access requests, messages associated with said access requests are not handled.

3. The method according to claim 1, wherein if said random access communications network detects a collision of access requests, auxiliary acknowledgement messages addressed to level 2 and 3 protocol layers are not transmitted to the network terminals associated with said collision.

4. The method according to claim 3, wherein if the network terminal has transmitted a message after reception of the acknowledgement message, the network terminal resends said access request if the network terminal has not received an auxiliary acknowledgement message from the network.

5. The method according to claim 1, wherein if the network terminal needs to transmit a message and said random access communications network has detected a collision of access requests, said network terminal resends said access request at a variable time interval.

6. The method according to claim 5, wherein said variable time interval varies at random.

7. The method according to claim 5, wherein said variable time interval varies within an interval between one tenth of a millisecond and a few tens of a millisecond.

8. The method according to claim 1, wherein if the random access communications network has acknowledged a first access request transmitted by a network terminal, a dedicated two-directional channel is assigned to said network terminal, and the contents of a measurement report message having measurements made by the said network terminal on at least one of said dedicated channel in the random access communications network to terminal direction (forward channel) and the signal quality received by the random access communications network on the dedicated channel are analyzed, and wherein the random access communications network sending power is modified as a function of the contents of said measurement report message.

9. The method according to claim 8, wherein the random access communications network sends a message to reconfigure said measurement report message on said dedicated channel.

10. The method according to claim 1, wherein if the random access communications network has acknowledged a first access request transmitted by a network terminal, a two-directional channel is dedicated to said network terminal, signal quality received on said two-directional channel is analyzed to adapt the configuration parameters of the dedicated channel as a function of the quality of the signal quality analysis, and if said two-directional channel is adapted based on said signal quality analysis, the random access communications network sends one or more reconfiguration messages on said dedicated channel containing the adapted configuration parameters, and said network terminal modifies the configuration of said two-directional channel in the network terminal to random access communications network direction.

11. The method according to claim 10, wherein said two-directional channel is adapted based on the sending power of said network terminal.

12. The method according to claim 10, wherein if the network terminal modifies the configuration of said two-directional channel in the network terminal to random access communications network direction, said network terminal sends a message confirming execution of the said modification to the random access communications network.

13. An equipment for management of access requests to a random access communications network in which time intervals are broken down into access slots, and during an access slot a network terminal transmits an access request to the random access communications network associated with a message to be transmitted by said network terminal, and said random access communications network comprises at least one processing device that causes a time for transmission of an access request acknowledgement message acknowledging said access request to said network terminal to exceed a duration of a given access slot in which the access request was transmitted, wherein said equipment executes the method according to claim 1.

14. The method according to claim 1, wherein the acknowledgment messages are periodically sent from the random access communications network to said network terminal.

15. The method according to claim 1, wherein the access request is an initial request having a preamble, by the network terminal to the random access communications network, to transmit the associated message over the random access communications network.

16. The method according to claim 1, wherein the random access communications network comprises at least one of a 3G satellite communications network, a W-CDMA network, a CDMA 200 satellite network, a TTA network, a CCSA network, an S-UMTS network, and an S-CSM/GPRS network.

17. The method according to claim 1, wherein the processing device is a satellite gateway.

18. The method according to claim 1, wherein the time intervals are intervals of time assigned by the random access communications network during which the network terminal is permitted to transmit data over the random access communications network.

* * * * *

UNITED STATES PATENT AND TRADEMARK OFFICE
CERTIFICATE OF CORRECTION

| | | |
|---|---|---|
| PATENT NO. | : 7,583,691 B2 | Page 1 of 1 |
| APPLICATION NO. | : 10/994305 | |
| DATED | : September 1, 2009 | |
| INVENTOR(S) | : Béatrice Martin | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Fourteenth Day of September, 2010

David J. Kappos
*Director of the United States Patent and Trademark Office*